H. GEARING.
MULTIPHASE ELECTRIC MOTOR.
APPLICATION FILED AUG. 10, 1912.

1,103,501.

Patented July 14, 1914.
3 SHEETS—SHEET 1.

WITNESSES
Edwin L. Bradford
M. D. Ballauf

INVENTOR
Harry Gearing
by Ritter & Ritter
his attys.

H. GEARING.
MULTIPHASE ELECTRIC MOTOR.
APPLICATION FILED AUG. 10, 1912.
1,103,501.
Patented July 14, 1914.
3 SHEETS—SHEET 3.
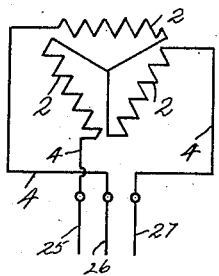
Fig.4.
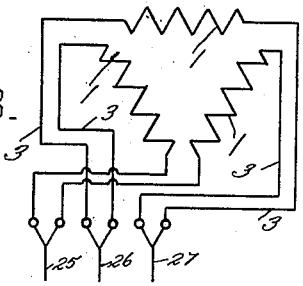
Fig.8.
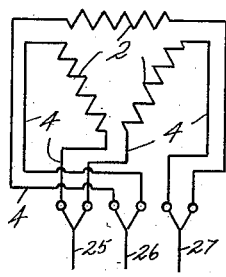
Fig.5.
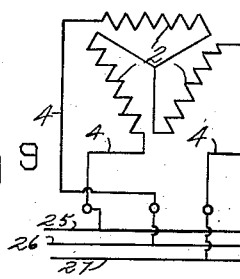
Fig.9
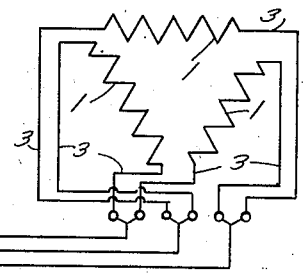
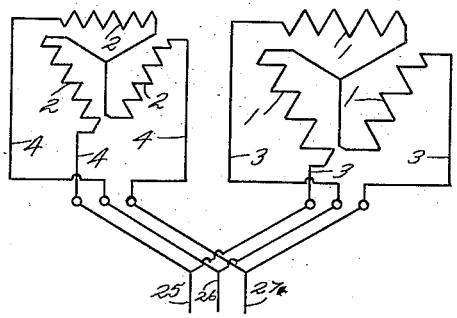
Fig.6
Fig.7
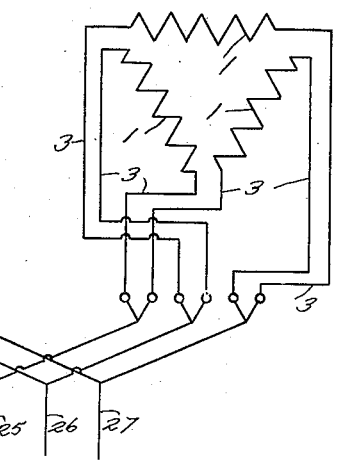
Fig.10.
WITNESSES
Edwin L. Bradford
E. C. Schuermann
INVENTOR
Harry Gearing
by Ritter & Ritter
his attys

UNITED STATES PATENT OFFICE.

HARRY GEARING, OF LOS ANGELES, CALIFORNIA, ASSIGNOR OF ONE-FOURTH TO CHARLES J. O'NEILL AND ONE-FOURTH TO GILBERT P. RITTER, BOTH OF THE DISTRICT OF COLUMBIA.

MULTIPHASE ELECTRIC MOTOR.

1,103,501.     Specification of Letters Patent.     Patented July 14, 1914.

Application filed August 10, 1912. Serial No. 714,363.

*To all whom it may concern:*

Be it known that I, HARRY GEARING, a subject of the King of the United Kingdom of Great Britain and Ireland, residing at Los Angeles, in the county of Los Angeles and State of California, have invented certain new and useful Improvements in Multiphase Electric Motors; and I do hereby declare the following to be a full, clear, and exact description of the invention, such as will enable others skilled in the art to which it appertains to make and use the same.

Figure 1:
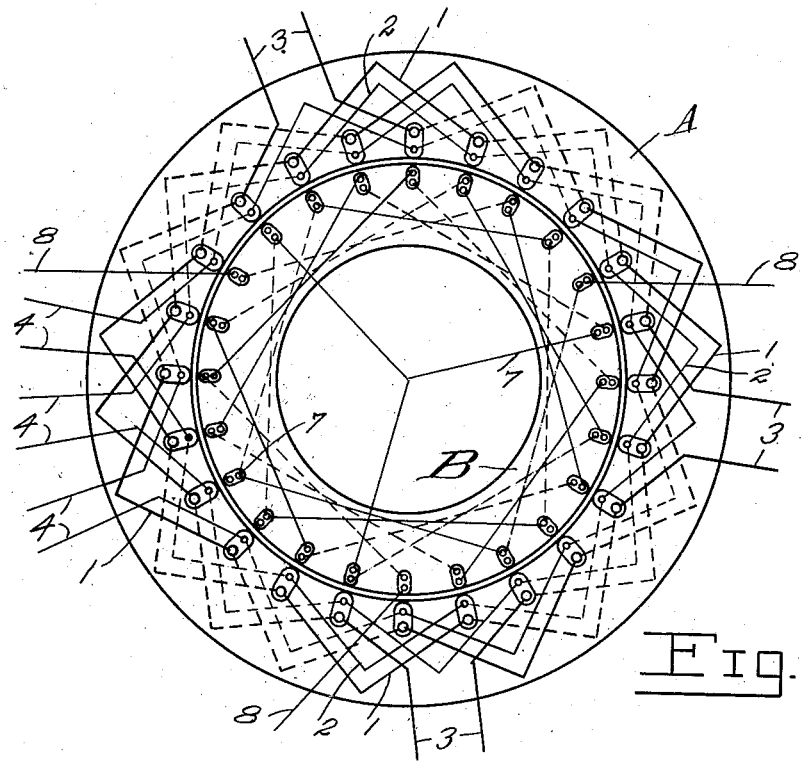
Figure 2:
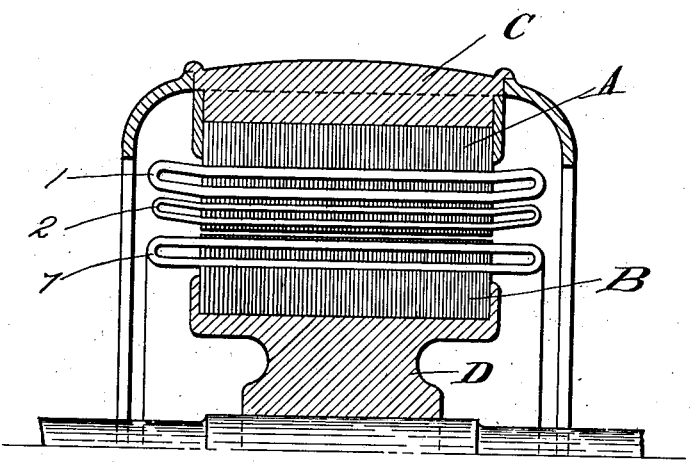
Figure 3:
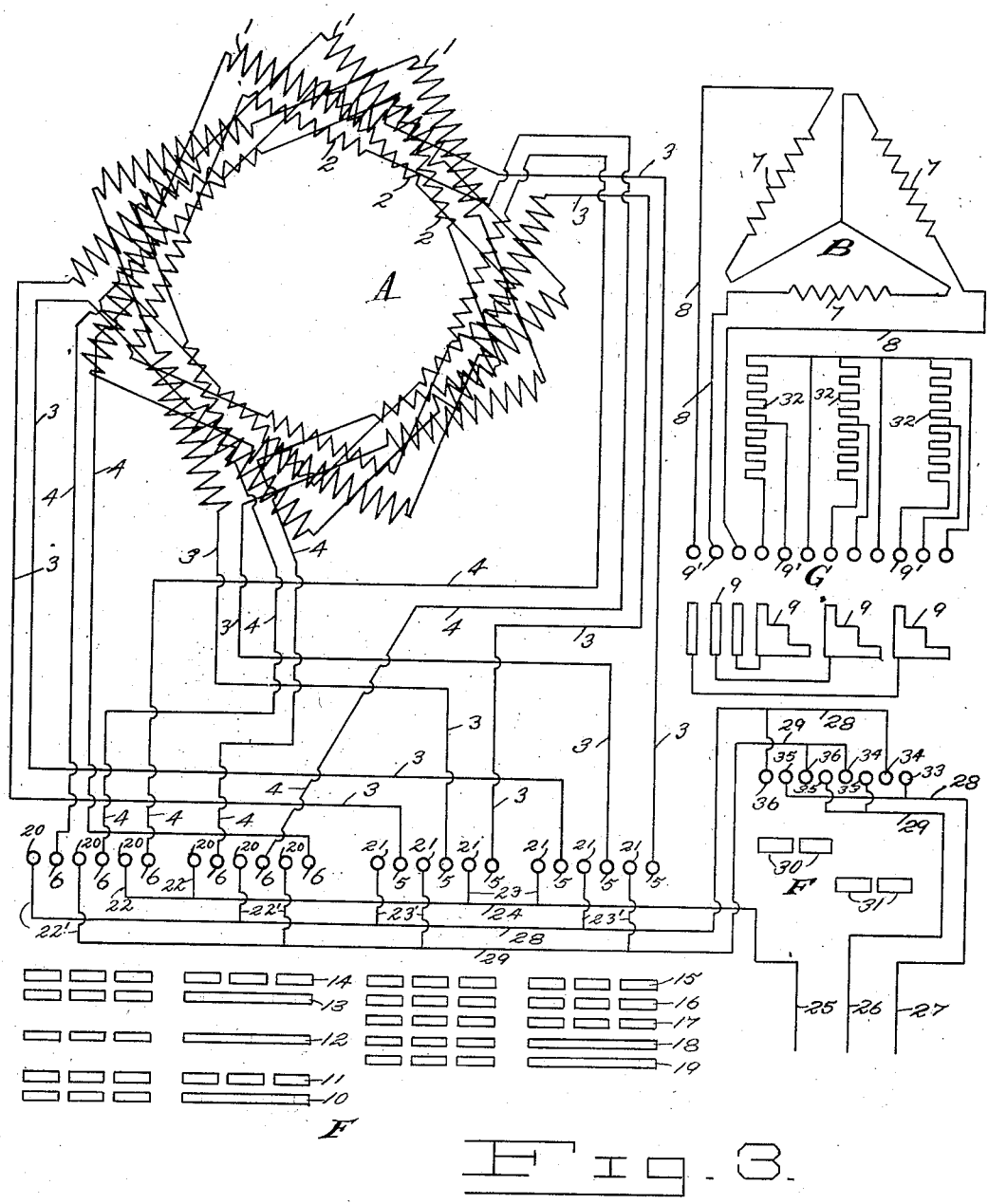

The invention relates to improvements in multiphase electric motors and means for controlling the same, whereby the power delivered by the motor may be selectively varied to accommodate different working conditions. A practical exemplification of the application of the invention to an induction motor is illustrated in the accompanying drawings, in which;

Figure 1 is a diagrammatic side elevation of the stator and rotor and the windings thereon. Fig. 2 is a vertical section through the upper half of the motor. Fig. 3 is a diagram of the motor windings and the control circuits. Figs. 4 to 10 illustrate diagrammatically the circuit connections of the stator windings for varying the power developed by the motor and as effected by the controller.

Referring to the drawings, A indicates the stator or field which may be constructed in any preferred or well known manner, and B is the rotor or armature.

C indicates the field frame, D the armature spider.

E designates the stator winding controller, F the reversing controller and G the resistance coils.

Mounted on the stator A are two separate windings, 1 and 2, the winding 1 being connected by leads 3 with stationary contacts 5 on the controller E, and windings 2 are severally connected by leads 4 with similar contacts 6 upon the controller. The armature conductors 7, of the phase-wound type, are provided with leads 8 which are severally connected to resistance G by means of sliding contacts 9.

Mounted in the controller E adjacent the contact blocks 5 and 6 are a series of stationary contacts 20 and 21 which are adapted to be connected to blocks 6 and 5 respectively, by means of the contact blocks 10 to 19 inclusive carried by the movable member of the controller, which is preferably of the ordinary barrel type, the said contacts 10 to 19 inclusive being distributed and arranged in horizontal and vertical rows, as indicated in Fig. 3, the several connections thus established serving to connect one or both of the stator windings 1 and 2 in various orders and arrangements, as will be more particularly explained hereinafter.

The leads from the power circuit indicated by numerals 25, 26 and 27 are adapted to be connected to the stationary contact blocks 20 and 21 as follows; two intermediate contact blocks 20 are connected by leads 22, 22 and lead 24 directly to the main power lead 25, and similarly the two intermediate contact blocks 21 are connected by leads 23, 23 and lead 24 to said main lead 25. The two outside pairs of contact blocks 20 and 21 are connected by leads 22' and 23' respectively through leads 28 and 29 and reversing controller F to the main leads 26 and 27.

The reversing controller F may be of any preferred form and as diagrammatically represented, consists of stationary contacts 35 and 36 adapted to be bridged by movable contacts 31 and two sets of stationary contacts 33 and 34 coöperating with bridging contacts 30.

In the practical construction of the apparatus, it is preferable that the movable contacts 30 and 31 and the resistance contact fingers 9 be mounted on the same controller drum so that when the circuit to the stator windings is closed, all of the resistance G, represented by the coils 32, is connected in the circuit of the rotor. For example, when the controller F is operated to bring the drum contacts 30 into bridging relation between stationary contacts 33 and 34, all of the resistance G is maintained in the rotor circuit and the handle of controller F may be still further operated to gradually cut out the resistance G without disturbing the closed relation of contacts 30, 33 and 34. Similarly, when a reversal of the controller F is desired and contact is broken at 33 and 34 and made at 35 and 36, the resistance G is all cut into the circuit of the rotor before the contact is broken at 30 and made at 31, which has the effect of preventing a rush of current through the rotor circuit and also tends to cut down the speed of the motor to prevent heavy shocks and jars in the actual reversal of the movement of the rotor. After reversal has been effected at the controller F, the resistance G may be gradually cut out without disturbing the relation of contacts 31, 35 and 36, so that the motor may be brought up to speed or the speed may be regulated as desired by merely shifting the handle of controller F.

As hereinbefore indicated, the power controller E is provided with a series of movable contacts 10 to 19 inclusive to coöperate with the fixed contacts 5, 6, 20 and 21 to effect different arrangements and combinations of the stator windings 1 and 2, and thereby selectively vary the power developed by the motor to meet the different conditions of work to be performed.

As illustrated in the diagram, when the power controller E is moved to its first point the contacts 10 bridge contacts 6 and 20 and close the circuits from the mains 25, 26 and 27 to the stator winding 2, so that the latter is connected to the power circuit in Y form or arrangement, as shown in Fig. 4. Upon moving the controller E to the second point, the winding 2 is connected in delta form through the set of movable contacts 11, as in Fig. 5. When the controller is moved to the third point, the stator winding 1 is connected to the main leads through the series of contacts 19 in Y arrangement, see Fig. 6. For the fourth position or point of the controller, the winding 2 is connected to the main leads in Y form through the series of contacts 12, and the stator winding 1 is connected in Y form to the main leads through the series of contacts 18, the two windings 1 and 2 therefore being connected to the main leads in parallel as illustrated in Fig. 7. When the controller handle is shifted to the fifth point, the winding 1 is connected in delta form through the series of contacts 17 see Fig. 8. Upon movement of the controller to the sixth point, the winding 2 is connected in Y form through the series of contacts 13 and the winding 1 is connected in delta form through the series of contacts 16 see Fig. 9. When the controller handle is moved to the seventh point, the winding 2 is connected in delta form through the contacts 14 and the winding 1 is also connected in delta form through the contacts 15 see Fig. 10. From the foregoing, it will be seen that by properly operating the controller E, seven different connections of the windings 1 and 2 resulting in seven distinct changes of power developed by the motor may be effected. Preferably the coils or windings 1 and 2 of the stator differ from each other in the number of turns in each, the winding 1, as represented, having the larger number of turns, whereby a wider variation in the power developed may be effected than if the two coils or windings were of the same size.

From the foregoing, it will also be apparent that the seven different powers may be obtained by manipulating the controller E and these same powers may be employed either in a forward or reverse direction of the rotor by properly operating the reversing controller F and that the speed of the motor may be accurately regulated by cutting in or out the resistance G, which is effected by means of the handle of the reversing controller F, as will be understood. To illustrate by concrete example, the possibilities of power variation in a motor of the character described, let it be assumed that the motor develops a maximum horse power of 30 and that the small coil or winding 2 of the stator contains approximately one-half as many turns as the larger coil or winding 1. Upon connecting the small coil 2 in Y, the H. P. developed will be 5.77; with a small coil alone in delta, the H. P. will be 10; with the large coil 1 only in Y connection, the H. P. will be 11.558; with the large coil only in delta connection the H. P. will be 20. With both coils 1 and 2 in Y connection, the H. P. will be 17.332; with both coils 1 and 2 in combination, delta connected, the H. P. will be 30; with the small coil 2 in delta connection in combination with the large coil 1 in Y connection, the H. P. will be 15.774; with the small coil in Y connection in combination with the large coil in delta, the H. P. will be 25.774.

From the foregoing, it will be apparent that the seven different powers indicated may be readily and economically obtained while the coils or windings are being worked at their regular capacity and without resistance in series.

While my invention has been explained with reference to a motor having but two sets of coils or windings upon the stator, it is to be understood that this special case has been chosen merely for the purposes of illustration, and that more than two sets of windings upon stator may equally well be employed.

What I claim is:—

1. The combination with a multiphase electric motor having a rotor winding and separate stator windings, of adjustable means for connecting the individual stator windings in Y or in delta arrangement with the power circuit and for connecting said winding to said power circuit in various combinations of Y, Y-delta, or delta-delta, whereby the power developed by the motor may be selectively varied.

2. The combination with a multiphase electric motor having a rotor winding and separate unequal stator windings, of adjustable means for connecting the individual stator windings in Y or in delta arrangement with the power circuit and for connecting said windings to said power circuit in various combinations of Y, Y-delta, or delta-delta, whereby the power developed by the motor may be selectively varied.

3. The combination with a multiphase electric motor having a rotor winding and separate stator windings, of a controller having fixed and movable contacts to connect the stator windings with the power circuit individually in Y or in delta relation and jointly in various combinations of Y, Y-delta, or delta-delta, whereby the power of the motor is selectively varied.

4. The combination with a multiphase electric motor having a rotor winding and separate stator windings, of adjustable means for connecting the individual stator windings in Y or in delta arrangement with the power circuit and for connecting said windings to said power circuit in various combinations of Y, Y-delta, or delta-delta, whereby the power developed by the motor may be selectively varied, and a reversing switch in the stator circuit.

5. The combination with a multiphase electric motor having a rotor winding and separate stator windings, of adjustable means for connecting the individual stator windings in Y or in delta arrangement with the power circuit and for connecting said windings to said power circuit in various combinations of Y, Y-delta, or delta-delta, whereby the power developed by the motor may be selectively varied, a regulable external resistance in the rotor circuit, and a reversing switch in the stator circuit adapted to cut the resistance into the rotor circuit with each reversal of the stator circuit.

In testimony whereof I affix my signature, in the presence of two subscribing witnesses.

HARRY GEARING.

Witnesses:
   JNO. T. HARRINGTON,
   H. C. RUSSELL.